United States Patent
Newman et al.

(10) Patent No.: US 7,555,422 B2
(45) Date of Patent: Jun. 30, 2009

(54) PRESERVING EMULATION CAPABILITY IN A MULTI-CORE SYSTEM-ON-CHIP DEVICE

(75) Inventors: Merril R. Newman, Schaumburg, IL (US); Osvaldo Franco, Apex, NC (US); Robert W. Milhaupt, Bloomingdale, IL (US)

(73) Assignee: Texas Instruments Incorporated, Dallas, TX (US)

( * ) Notice: Subject to any disclaimer, the term of this patent is extended or adjusted under 35 U.S.C. 154(b) by 472 days.

(21) Appl. No.: 11/301,842

(22) Filed: Dec. 12, 2005

(65) Prior Publication Data
US 2007/0136047 A1   Jun. 14, 2007

(51) Int. Cl.
G06F 9/455   (2006.01)
(52) U.S. Cl. .................................... 703/23; 714/726
(58) Field of Classification Search .................... 703/28
See application file for complete search history.

(56) References Cited

U.S. PATENT DOCUMENTS

| | | | | |
|---|---|---|---|---|
| 4,573,117 | A | * | 2/1986 | Boney ........................ 713/330 |
| 5,251,320 | A | * | 10/1993 | Kuzawinski et al. ........ 713/324 |
| 5,329,471 | A | * | 7/1994 | Swoboda et al. ............. 703/23 |
| 5,379,302 | A | * | 1/1995 | Andrews ..................... 714/727 |
| 6,006,343 | A | * | 12/1999 | Whetsel ....................... 714/28 |
| 6,073,254 | A | * | 6/2000 | Whetsel ....................... 714/30 |
| 6,385,749 | B1 | * | 5/2002 | Adusumilli et al. ......... 714/733 |
| 6,398,905 | B1 | | 6/2002 | Ward ........................... 156/345 |
| 6,477,654 | B1 | * | 11/2002 | Dean et al. .................. 713/300 |
| 6,883,102 | B2 | * | 4/2005 | Williams et al. ............ 713/300 |
| 6,928,606 | B2 | * | 8/2005 | Savaria et al. .............. 714/797 |
| 7,051,256 | B2 | * | 5/2006 | Whetsel ...................... 714/726 |

OTHER PUBLICATIONS

Whetsel, Lee, "An IEEE 1149.1 Based Test Access Architecture For IC's With Embedded Cores", Proceedings of the International Test Conference, pp. 69-78, 1997.*
Rajsuman, Rochit, "Design for Iddq Testing for Embedded Cores Based on System on a Chip", Proceedings of the 1998 IEEE International Workshop on IDDQ Testing, Nov. 12-13, 1998, pp. 69-73.*

(Continued)

Primary Examiner—Paul L Rodriguez
Assistant Examiner—Mary C Jacob
(74) Attorney, Agent, or Firm—Ronald O. Neerings; Wade James Brady, III; Frederick J. Telecky, Jr.

(57) ABSTRACT

A system comprises a multi-core silicon-on-chip (SOC) device. The SOC device includes a core module, a test data shift path, a core power control module, and an emulation control module. The core module includes a TAP controller and a plurality of data registers. The test data shift path is operable to transport data shifted out of one or more of the data registers. The core power control module is operable to control the power status of the core module. The emulation control module includes a plurality of alternative registers operable to shift data into the test data shift path in the event that the core module is powered down by the core power control module such that the shift path continues uninterrupted. The emulation control module remains powered on regardless of the power status of the core module.

27 Claims, 3 Drawing Sheets

OTHER PUBLICATIONS

Lu et al, "IEEE 1149.1 Based Defect and Fault Tolerant Scan Chain for Wafer Scale Integration", Proceedings of the 18th IEEE International Symposium on Defect and Fault Tolerance in VLSI Systems, 2003.*

Vermeulen et al, "IEEE 1149.1 Compliant Access Architecture for Multiple Core Debug on Digital System Chips", Proceedings of the International Test Conference, 2002, pp. 55-63.*

* cited by examiner

PRESERVING EMULATION CAPABILITY IN A MULTI-CORE SYSTEM-ON-CHIP DEVICE

TECHNICAL FIELD OF THE INVENTION

This invention relates in general to emulation of system-on-chip devices for debugging purposes, and, more particularly, to preserving emulation capability in a multi-core system-on-chip where one or more of the cores can be powered down.

BACKGROUND OF THE INVENTION

System-on-chip (SOC) ASIC devices with embedded cores, such as a DSP core or an ARM core, typically have the capability for in-circuit emulation. Emulation includes the monitoring and controlling of the state of such cores. Emulation is a development tool used in debugging hardware/software interactions or interfaces, as well as debugging software failures. Such emulation is typically a pre-production debugging tool, but may also be used for post-production testing.

Existing in-circuit emulation techniques allow the capture and/or control of SOC-internal registers to aid in the integration and/or debugging of the SOC device. These captured register values are provided off-chip with a serial scan chain. If a core that is included within the scan chain is powered off during the emulation process, the scan chain is interrupted. This interruption not only causes the loss of data relative to the powered-off core, but also breaks the scan chain and blocks data from all other cores that are still being emulated from exiting the chip, and prevents new data from flowing into the chip. In short, in a multi-core SOC device, if one or more of the cores are powered down during an emulation operation, the emulation capability for the whole device is destroyed.

For some applications, emulation makes use of IEEE standard 1149.1: Standard Test Access Port and Boundary Scan Architecture, commonly known by the acronym JTAG (for the Joint Test Action Group whose recommendations were used as the basis of the 1149.1 standard).

The main advantage of using such boundary scan technology is that the values on pins may be set and read without physical access. The signals between the SOC device's core logic and the "pins" are intercepted by a serial scan datapath known as the boundary scan register (BSR). In normal operation these boundary scan cells are invisible. However, in test mode the cells can be used to set and/or read values: in external mode these will be the values of the "pins"; in internal mode these will be the values of the core logic.

The serial datapath is communicated into the device through a JTAG serial input pin, through a test access port (TAP) controller (which is effectively a JTAG controller) associated with a first core, out of that TAP controller and into a TAP controller associated with a second core, and so on through a series of TAP controllers, each associated with a different core, and finally out of the device through an output pin. If a particular TAP controller is powered down during an emulation operation, the serial chain of the datapath (which is effectively a long shift register) is blocked at that powered-down TAP controller and the emulation process is corrupted.

SUMMARY OF THE INVENTION

In accordance with the present invention, systems and methods are provided for preserving emulation capability in multi-core system-on-chip (SOC) devices where one or more of the cores can be powered down.

According to one embodiment, a system comprises a multi-core SOC device that includes a core module, a test data shift path, a core power control module, and an emulation control module. The core module includes a TAP controller and a plurality of data registers. The test data shift path is operable to transport data shifted out of one or more of the data registers. The core power control module is operable to control the power status of the core module. The emulation control module includes a plurality of alternative registers operable to shift data into the test data shift path in the event that the core module is powered down by the core power control module such that the shift path continues uninterrupted. The emulation control module remains powered on regardless of the power status of the associated core module.

According to another embodiment, a system comprises a multi-core SOC device that includes a core module, a test data shift path, a core power control module, and an emulation control module. The core module includes a plurality of data registers. The test data shift path is operable to transport data shifted out of one or more of the data registers. The core power control module is operable to control the power status of the core module. The emulation control module includes an emulation power controller operable to communicate with the core power control module in order to prevent the core power control module from changing the power status of the core module during particular emulation operations. The emulation control module remains powered on regardless of the power status of the associated core module.

According to yet another embodiment, a method of maintaining emulation capability in a multi-core SOC device is provided. The method includes performing an emulation operation including shifting data out of one of a plurality of data registers associated with a core module and along a test data shift path. An instruction to power down the core module is received from a core power control module, and the core module is powered down during the emulation operation. Data is shifted out of a plurality of alternative registers and along the test data shift path in response to the core module being powered down, such that the test data shift path continues uninterrupted. The alternative registers remain powered on when the associated core module is powered down.

Various embodiments of the present invention may benefit from numerous advantages. It should be noted that one or more embodiments may benefit from some, none, or all of the advantages discussed below.

One advantage is that an emulation system is provided that reduces or eliminates corruption of an emulation operation typically caused by one or more cores of a multi-core SOC being powered down during the emulation operation. In certain embodiments, alternate shift registers are provided that allow the serial emulation scan chain to continue uninterrupted when one or more cores on the SOC are powered down. Thus, likelihood of data regarding the powered-off cores being corrupted is reduced. In addition, the continuation of the scan chain allows data from other cores to exit the chip, and allows new data to continue flowing into the chip.

Another advantage is that in certain embodiments, an emulation control system communicates with a power control system to prevent cores from being powered down during an emulation operation or during particular portions of an emulation operation.

Another advantage is that in certain embodiments, an emulation environment that is more representative of real-world operation is created. In mission mode, the various cores of the SOC will power up and down, as governed by the operating system and the particular set of applications that are running on the SOC. Decoupling the running of emulation accesses to the SOC from the powering up and down of the cores may allow mission mode peculiarities to be better observed. Thus a practical aspect of the invention becomes allowing mission mode power sequencing to continue while emulation is taking place.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Example embodiments of the present invention and their advantages are best understood by referring now to FIGS. 1 through 4 of the drawings, in which like numerals refer to like parts.

Among other things, various embodiments of the present invention are directed toward systems and methods for preserving in-circuit emulation capabilities of a multi-core SOC in which one or more of the cores can be powered down. In certain embodiments, alternate shift registers are provided that allow the serial datapath used by the emulation system to continue uninterrupted when one or more cores on the SOC are powered down. In certain other embodiments, an emulation control system communicates with a power control system to prevent cores from being powered down during an emulation operation or during particular portions of an emulation operation.

Figure 1:
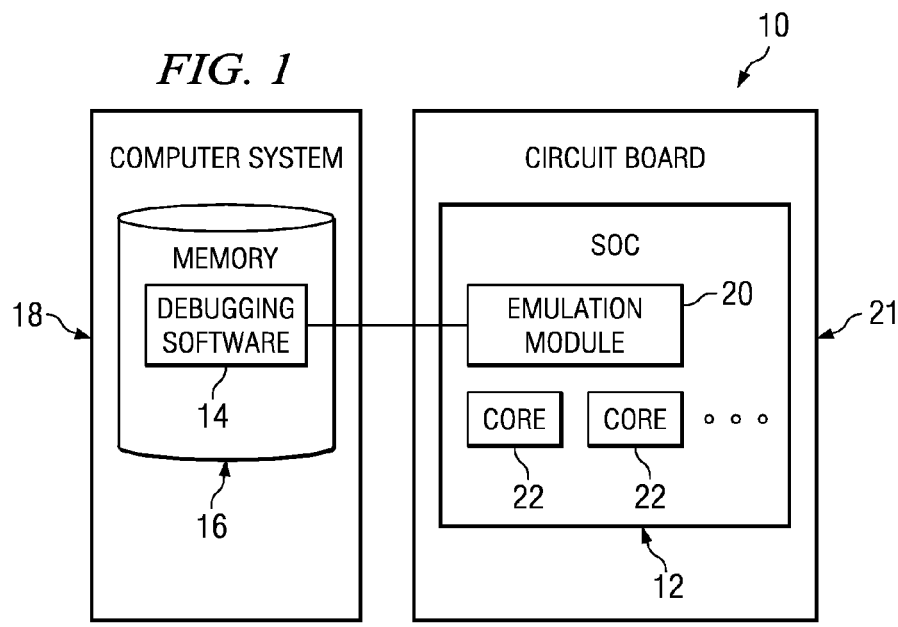
FIG. 1 illustrates an example emulation system for debugging a multi-core SOC device according to an embodiment of the present invention.

FIG. 1 illustrates an example emulation system 10 for debugging a multi-core SOC device 12 according to an embodiment of the present invention. Emulation system 10 includes debugging software 14 stored in memory 16 of a computer system 18, and an emulation module 20 associated with SOC 12. SOC 12 is coupled to a circuit board 21 and includes a plurality of cores 22, in addition to emulation module. Emulation module 20 may include a plurality of emulation control modules. Each emulation control module may be associated with a unique core 22. Each emulation control module may remain powered even if its associated core 22 is powered down.

Computer system 18 may include a personal computer, workstation, network computer, one or more processors within these or other devices, or any other suitable processing device. Memory 16 may include any suitable device for storing software that may be executed by computer system 18, such as random access memory (RAM), read-only memory (ROM), dynamic random access memory (DRAM), fast cycle RAM (FCRAM), static RAM (SRAM), a field-programmable gate array (FPGA), erasable programmable read-only memory (EPROMs), or electrically erasable programmable read-only memory (EEPROMs), for example.

Debugging software 14 may include any software suitable to initiate and/or manage emulation processes on SOC 12 in order to assist with the integration and/or debugging of SOC 12. Debugging software 14 may provide an interface allowing a human (such as an engineer) to manage the debugging process. In certain embodiments discussed herein, debugging software 14 utilizes emulation processes that operate according to the JTAG, or IEEE-1149.1, serial communication protocol.

Cores 22 are embedded cores that have the capability for emulation. For example, cores 22 may include one or more ARM processor cores, DSP processor cores and/or any other cores suitable for emulation. Scan chains used for emulation by the cores 22 are configured in series and may be independently powered up or down during the operation of SOC 12. Emulation module 20 includes various hardware and logic for performing emulation processes to assist with the debugging and/or testing of SOC 12.

In general, emulation system 10 monitors and controls the emulation state of each core 22 during system operation. Emulation system 10 allows access to both monitor and update the state of each core 22, even in the event that one or more cores 22 are powered down during an emulation process. In other words, emulation system 10 maintains the emulation capability of SOC 12 regardless of changes to the power status of each core 22. In certain embodiments, emulation system 10 prevents cores 22 from being powered down during an emulation operation or during particular portions of an emulation operation.

Figure 2:
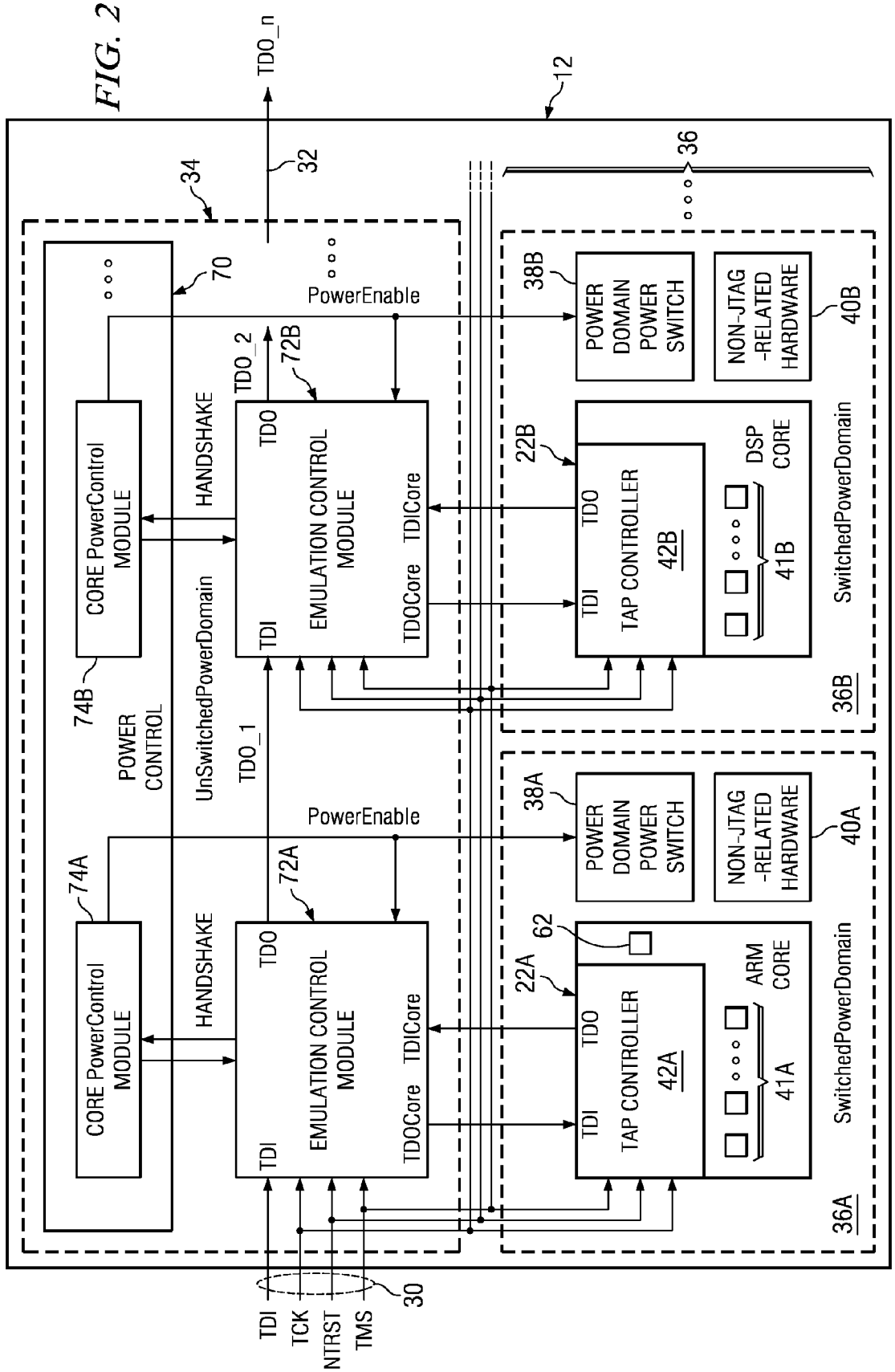
FIG. 2 illustrates the SOC device of the system of FIG. 1 in accordance with an embodiment of the invention.

FIG. 2 illustrates SOC 12 of the system of FIG. 1 in accordance with an embodiment of the invention. SOC 12 includes a number of JTAG-related input pins 30, a JTAG output pin 32, a constant power domain 34 and a plurality of switched power domains 36.

Switched power domains 36 may be powered up or down (in other words, on or off) during the operation of SOC 12. In contrast, constant power domain 34 remains powered on regardless of the power status of each switched power domain 36.

Each switched power domain 36 includes a core 22, a power domain power switch, and various other hardware that is generally not emulation-related. In the embodiment shown in FIG. 2, a first power domain 36A includes an ARM processor core 22A, a corresponding power domain power switch 38A, and various non-emulation-related hardware 40A associated with ARM core 22A. A second power domain 36B includes a DSP processor core 22B, a corresponding power domain power switch 38B, and various non-emulation-related hardware 40B associated with DSP core 22B. Although only cores 22A and 22B are discussed in detail herein, SOC 12 may further include any number of additional cores 22, including a single one.

Each core 22A and 22B includes core logic, various registers, indicated at 41A and 41B, and a TAP controller, indicated at 42A and 42B. Each TAP controller 42A and 42B is a state machine that is used by the emulation system to control emulation features within the corresponding cores 22A and 22B, respectively, as discussed below in greater detail.

Figure 3:
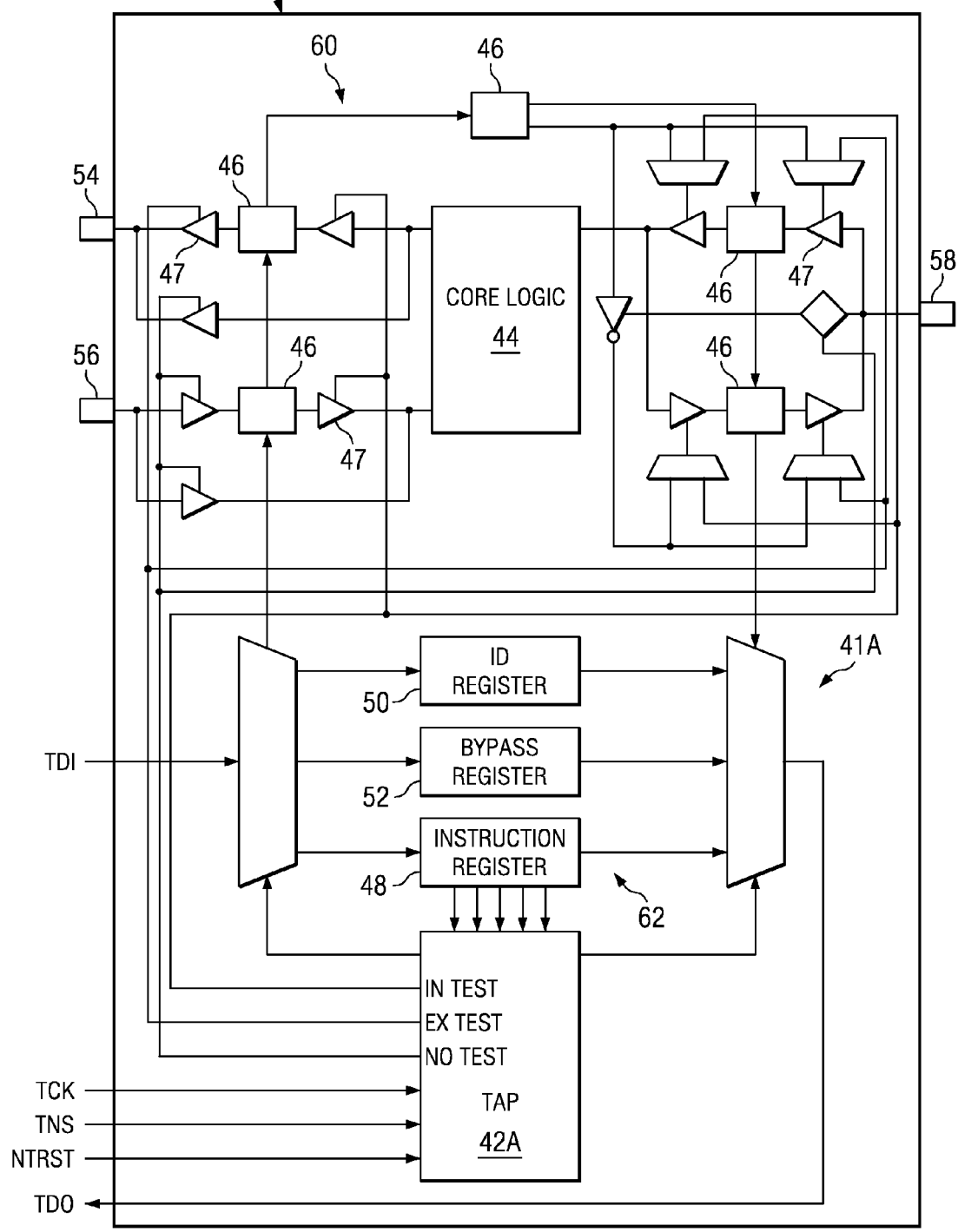
FIG. 3 illustrates an example architecture of a core in accordance with an embodiment of the present invention.

FIG. 3 illustrates an example architecture of a typical core 22A having a tap controller 42A. In particular, FIG. 3 illustrates how the present invention may fit in with, or connect to, an example typical core/tap implementation or strategy.

The example core 22A shown in FIG. 3 includes TAP controller 42A, core logic 44, boundary scan cells 46, gates 47, various registers 41A—including an instruction register 48, a device ID register 50, a bypass register 52, and a boundary scan register 60—and pins 54, 56 and 58.

Signals between the chip's core logic 44 and pins 54, 56 and 58 are intercepted by a serial scan path known as the boundary scan register, or BSR, 60, which includes boundary scan cells 46. Boundary scan cells 46 may include any suitable combination of input cells, output cells and/or enable cells.

In normal system operation, boundary scan register 60 can transparently connect the core logic signals to pins 54, 56 and 58 and effectively become invisible. In external-test mode, BSR 60 can disconnect core logic 44 from pins 54, 56 and 58, drive output pins 54 and 58 by itself, and read and latch the states of input pins 56 and 58. In internal-test mode, BSR 60 can disconnect core logic 44 from pins 54, 56 and 58, drive the input signals of core logic 44 by itself, and read and latch the states of the output signals of core logic 44.

Gates 47 operate under the control of TAP controller 42A and/or enable cells 46 to capture, or apply, the states (contents) of the respective input or output cells 46 to or from pins 54, 56 and 58 and core logic 44. The capture or application of such states occurs during certain transitions of TAP controller 42A if instruction register 48 has been previously loaded with the proper opcode(s).

The contents of BSR 60 can be written and read bit-by-bit, in serial fashion, using the TDI and TDO JTAG signals. In particular, BSR 60 read and write operations occur at the same time, with the new value shifted in from TDI, which the previous value is shifted out from TDO. The same technique is used to read and write the values of other JTAG registers as well, such as device ID register 50 or bypass register 52, by having TAP controller 42A connect such registers between the TDO and TDI pins, in place of BSR 60. The same mechanism can also be employed to access core emulation registers.

The JTAG interface for core 22A uses the following five dedicated signals that support the standard:

1. TCK—the TCK or "test clock" input controls the timing of the test interface independently from any system clocks in order to synchronize the internal state machine operations.

2. TMS—the TMS or "test mode state" input controls the transitions of the test interface state machine.

3. TDI—the TDI or "test data input" line supplies the data to the JTAG registers (BSR 60, instruction register 48, device ID register 50, bypass register 52, and/or other JTAG registers).

4. TDO—the TDO or "test data out" line is used to serially output data from the JTAG registers to the equipment controlling the test, such as computer system 18. It carries the sampled values from BSR 60 or other JTAG register(s) and propagates them to the next TAP controller in series, namely TAP controller 42B associated with core 22B.

5. NTRST—the NTRST or "test reset" input initializes and/or disables the test interface.

TAP controller 42A controls the operation of the test interface. TAP controller 42A is a state machine whose state transitions are controlled by the TMS signal. TAP controller 42A controls the operations of the JTAG data registers and instruction register 48. The JTAG data registers include device ID register 50, bypass register 52, and BSR 60, and are indicated collectively as data registers 62. The contents of instruction register 48 operate to select between the various data registers 50, 52 and 60 to be operated upon during a data register path, or "dr path."

Returning to FIG. 2, unswitched power domain 34 includes a power control system 70 and a pair of emulation control modules 72A and 72B corresponding with cores 22A and 22B, respectively. Unswitched power domain 34 similarly includes additional emulation control modules corresponding with each additional core 22 not shown.

Power control system 70 includes a power control module 74A corresponding with switched power domain 36A and a power control module 74B corresponding with switched power domain 36B. Power control system 70 similarly includes power control modules corresponding with each switched power domain 36 not shown. Power control modules 74A and 74B communicate power status command signals (on/off) to power domain power switches 38A and 38B, respectively, in order to control the power of switched power domains 36A and 36B, respectively. These power status command signals are indicated in FIG. 2 as "power enable" signals.

Emulation control modules 72A and 72B provide additional emulation functionality in order to maintain emulation capability of SOC device 12. In some embodiments, emulation control modules 72A and 72B cooperate with cores 22A and 22B to monitor ongoing emulation operations to cores 22A and 22B and to provide an alternative shift path for emulation data when one or both of cores 22A and 22B are powered down during an emulation process, thus maintaining the integrity of the emulation shift path. In other embodiments, emulation control modules 72A and 72B cooperate with core power control modules 74A and 74B in order to prevent cores 22A and 22B from being powered down during an emulation process or during certain portions of an emulation process.

Figure 4:
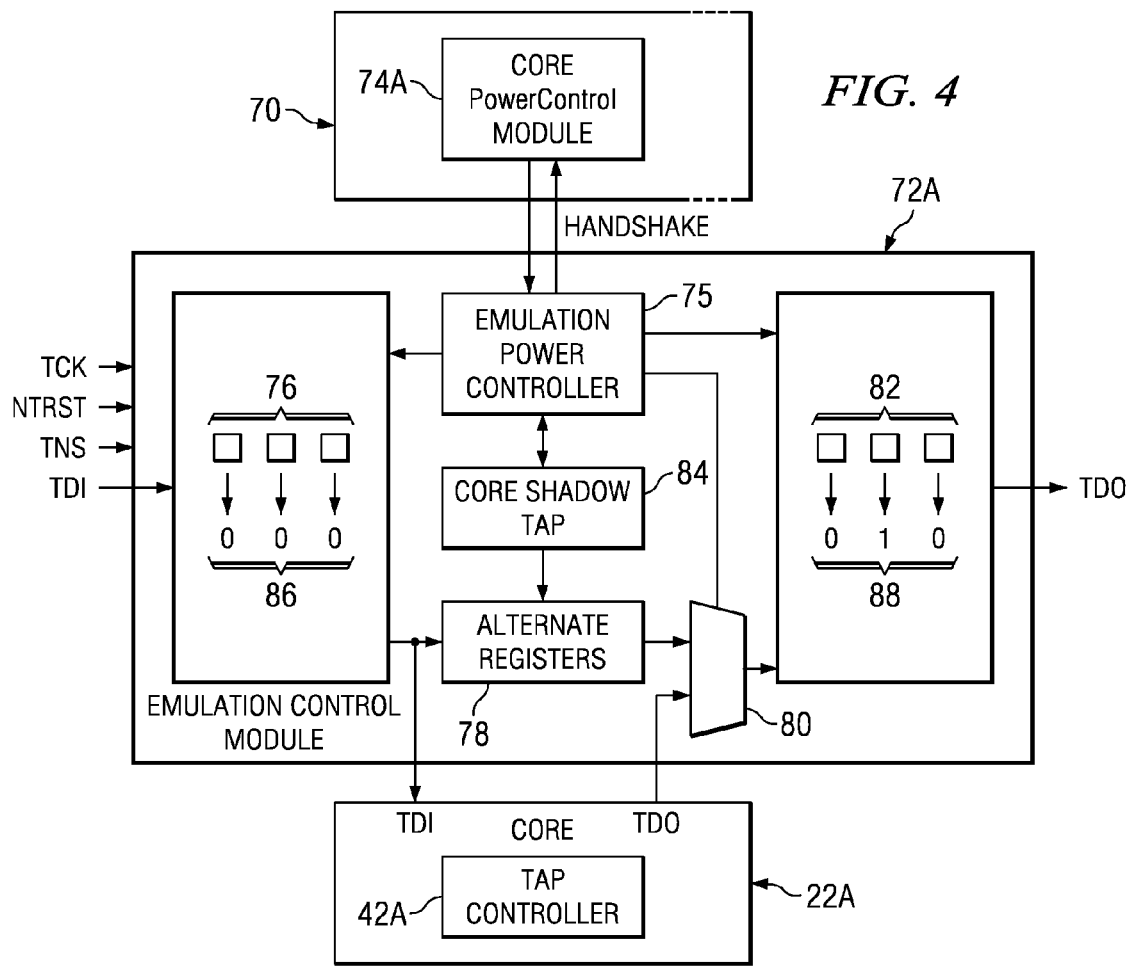
FIG. 4 illustrates an example architecture of an emulation control module in accordance with an embodiment of the present invention.

FIG. 4 illustrates an example architecture of emulation control module 72A in accordance with an embodiment of the present invention. Emulation control module 72A includes an emulation power controller 75, first power status registers 76, alternative registers 78, a multiplexer 80, second power status registers 82, and a core shadow TAP 84.

In general, emulation power controller 75, first power status registers 76, alternative registers 78, a multiplexer 80, second power status registers 82, core 22a, and core shadow TAP 84 cooperate to maintain the integrity of the TDI-TDO emulation shift path during an emulation operation.

First power status registers 76 are operable to inject a particular number of power status indicating bits 86 into the serial TDI-TDO stream to indicate the core power status at the beginning of the emulation shift operation. Second power status registers 82 are operable to inject a particular number of power status indicating bits 88 into the serial TDI-TDO stream to indicate the core power status at the end of the emulation shift operation. In a particular embodiment, the number of first power status registers 76 is equal to the number of second power status registers 82.

Power status indicating bits 86/88 indicate the power status of active core 22A before and after an emulation operation. For example, in one embodiment, three power status indicating bits 86/88 are used to indicate the power status of active core 22A at the beginning and the end of an emulation operation as follows:

| Bits | Beginning status/Ending status |
|------|--------------------------------|
| 000  | On/On |
| 001  | On/Off |
| 010  | Off/On |
| 011  | Off/Off |
| 100  | Toggle (power status of core 22A changed more than once during the emulation) |

The power status indicating bits 86/88 travel through the remainder of the serial emulation path, out of SOC device 12, and are read and interpreted by debugging software 14 to assist in the testing and/or debugging of SOC device 12.

Alternative registers 78 provide an alternative shift path in the event that core 22A is powered down during an emulation operation. Multiplexer 80 selects either the shift data coming from alternative registers 78 or the shift data coming from one of the data registers 62 of core 22A. Multiplexer 80 makes such selection based on power status input received from emulation power controller 75. For example, when core 22A is powered on, multiplexer 80 selects the shift data coming from data registers 62 of core 22A. When core 22A is powered down, multiplexer 80 receives power status input from emulation power controller 75 indicating that core 22A is being powered down, and in response, selects the shift data coming from alternative registers 78. Thus, when core 22A is powered down, multiplexer 80 switches to begin accepting shift data from alternative registers 78 such that the serial TDI-TDO shift path continues uninterrupted.

Core shadow TAP 84 is a shadow copy of TAP controller 42A and, as shown in FIG. 2, receives the input signals TCK, TMS and NTRST in parallel with TAP controller 42A. In addition, core shadow TAP 84 receives power status information from emulation power controller 75 regarding the power status of core 22A. Using these various input signals, core shadow TAP 84 monitors the state of TAP controller 42A. In particular, core shadow TAP 84 knows the length (in other words, the number of shift registers, or bits) of each data register 62 provided by TAP controller 42A, including device ID register 50, bypass register 52, BSR 60, any other data register 62 provided by TAP controller 42A, and all other data registers provided internal to core logic 44). Further, core shadow TAP 84 monitors instruction register 48 of TAP controller 42A in order to determine which data register 62 is currently being used in the emulation operation.

Having knowledge of the particular data register 62 in use, and the length in bits of that particular data register 62, core shadow TAP 84 tracks the progress of the shift path running though core 22A (assuming that core 22A is initially powered on). In particular, core shadow TAP 84 tracks the number of bits that have been shifted out from core 22A and the number of remaining bits to be shifted out from core 22A. Thus, when core shadow TAP 84 receives power status data from emulation power controller 75 indicating that core 22A is being powered down, core shadow TAP 84 communicates to alternative registers 78 the number of remaining bits to be shifted out from core 22A. Thus, the appropriate number of alternative registers 78 may be used to shift the appropriate number of bits to multiplexer 80, which begins forwarding bits from alternative registers 78 when core 22A is powered down, as described above.

In some embodiments, as shown in FIG. 4, emulation power controller 75 and core power control module 74A are operable to communicate with each other in a handshaking fashion in order to prevent core power control module 74A from changing the power state of core 22A during an emulation operation or during a particular portion of an emulation operation. In certain embodiments, when core power control module 74A wishes to change the power state of core 22A, it sends a power-down request to emulation power controller 75. Emulation power controller 75 sends a response indicating whether core power control module 74A may change the power state of core 22, or in the alternative, a subsequent time at which core power control module 74A may change the power state of core 22 such that the emulation of core 22A is not affected. In one embodiment, emulation power controller 75 only allows core power control module 74A to change the power state of core 22A in between periods of access to any of the data registers 62.

In some embodiments in which emulation power controller 75 is operable to cooperate with core power control module 74A to prevent core power control module 74A from powering down core 22A during emulation as discussed above, the components of emulation control module 72A for providing an alternative shift path (such as first power status registers 76, alternative registers 78, multiplexer 80, second power status registers 82 and/or core shadow TAP 84) are not be included within emulation control module 72A. In other embodiments, such as the embodiment shown in FIG. 4, emulation control module 72A may be operable to both prevent changes to the power state of core 22A during an emulation operation, and in the alternative, to provide an alternative shift path in the event that core 22A is powered down during an emulation operation.

It should be understood that the functionality discussed above regarding switched power domain 36A, core 22A, emulation control module 72A and core power control module 74A applies similarly to switched power domain 36B, core 22B, emulation control module 72B and core power control module 74B, as well as to other switched power domains, cores, emulation control modules and core power control modules within SOC device 12.

In addition, although embodiments of the invention and its advantages have been described in detail, a person skilled in the art could make various alterations, additions, and omissions without departing from the spirit and scope of the present invention as defined by the appended claims.

What is claimed is:

1. A system, comprising:
    a multi-core silicon-on-chip device including:
        a core module including a TAP controller and a plurality of data registers;
        a test data shift path operable to transport data shifted out of one or more of the data registers;
        a core power control module operable to control the power status of the core module; and
        an emulation control module including a plurality of alternative registers operable to shift data into the test data shift path in the event that the core module is powered down by the core power control module such that the shift path continues uninterrupted;
        wherein the emulation control module remains powered on regardless of the power status of the core module.

2. The system of claim 1, wherein the emulation control module further includes one or more power status registers operable to inject one or more power status bits into the test data shift path, the one or more power status bits comprising information regarding the power status of the core module.

3. The system of claim 2, wherein the one or more power status bits indicate the power status of the core module at both the beginning and the end of an emulation operation.

4. The system of claim 2, wherein the value of the one or more power status bits is determined based on power status information received from the core power control module, the power status information including information regarding the power status of the core module.

5. The system of claim 1, wherein the the emulation control module further includes:
    one or more first power status registers positioned upstream from the data registers and the alternative registers, the first power status registers operable to inject one or more power status bits comprising information regarding the power status of the core module into the test data shift path; and one or more second power status registers positioned downstream from the data registers and the alternative registers, the second power status registers operable to inject one or more power status bits comprising information regarding the power status of the core module into the test data shift path.

6. The system of claim 5, wherein the one or more power status bits indicate the power status of the core module at both the beginning and the end of an emulation operation.

7. The system of claim 1, wherein the the emulation control module further includes a shadow TAP operable to:
monitor the state of the TAP controller; and
control the alternative registers in order to output the appropriate number of bits into the test data shift path in the event that the core module is powered down during an emulation operation.

8. The system of claim 7, wherein:
the core module includes an instruction register that controls which of the data registers is selected for various emulation operations;
the shadow TAP is operable to monitor the instruction register to determine which one of the data registers is being used in a particular emulation operation; and
in the event that the core module is powered down during an emulation operation, the shadow TAP is operable to determine the number of bits to shift from the alternative registers into the test data shift path based at least on the data register determined by the shadow TAP.

9. The system of claim 1, wherein the emulation control module further includes a multiplexer operable to:
receive data shifted out of one of the data registers;
receive data shifted out of the alternative registers;
receive power status change data from the core power control module, the power status change data indicating a change in the power status of the core module;
select either data received from the data register or data received from the alternative registers to communicate along the test data shift path, wherein the selection is based at least on the received power status change data.

10. The system of claim 9, wherein the multiplexer is operable to:
select data received from the data register to communicate along the test data shift path when the core module is powered on;
receive power status change data from the core power control module, the power status change data indicating that the core module is powering down; and
in response to receiving the power status change data, select data received from the alternative registers to communicate along the test data shift path.

11. The system of claim 1, wherein the emulation control module further includes an emulation power controller operable to communicate with the core power control module in order to prevent the core power control module from changing the power status of the core module during particular emulation operations and/or to completely prevent core power off during emulation.

12. The system of claim 11, wherein the emulation power controller is operable to:
determine the status of an ongoing emulation operation based at least on one or more emulation input signals being received in parallel by the emulation control module and the core module;
receive from the power control module a request to change the power status of the core module;
determine whether and/or if to approve the request based at least on the status of the ongoing emulation; and
send a response to the power control module indicating whether the request was approved.

13. The system of claim 12, wherein the emulation power controller is operable to:
determine an appropriate time to allow the power control module to change the power status of the core module;
send a response to the power control module indicating the determined appropriate time.

14. A system, comprising:
a multi-core silicon-on-chip device including:
a core module including a plurality of data registers;
a test data shift path operable to transport data shifted out of one or more of the data registers;
a core power control module operable to control the power status of the core module; and
an emulation control module including an emulation power controller operable to communicate with the core power control module in order to prevent the core power control module from changing the power status of the core module during particular emulation operations;
wherein the emulation control module remains powered on regardless of the power status of the core module.

15. The system of claim 14, wherein the emulation power controller is operable to:
determine the status of an ongoing emulation operation based at least on one or more emulation input signals being received in parallel by the emulation control module and the core module;
receive from the power control module a request to change the power status of the core module;
determine whether to approve the request based at least on the status of the ongoing emulation; and
send a response to the power control module indicating whether the request was approved.

16. The system of claim 15, wherein the emulation power controller is operable to:
determine an appropriate time to allow the power control module to change the power status of the core module;
send a response to the power control module indicating the determined appropriate time.

17. A method of maintaining emulation capability in a multi-core silicon-on-chip device, the method comprising:
performing an emulation operation including shifting data out of one of a plurality of data registers associated with a core module and along a test data shift path;
receiving from a core power control module an instruction to power down the core module;
powering down the core module during the emulation operation;
shifting data out of a plurality of alternative registers and along the test data shift path in response to the core module being powered down, such that the test data shift path continues uninterrupted;
wherein the alternative registers remain powered on when the core module is powered down.

18. The method of claim 17, further comprising injecting one or more power status bits into the test data shift path, the one or more power status bits comprising information regarding the power status of the core module.

19. The method of claim 18, wherein the one or more power status bits indicate the power status of the core module at both the beginning and the end of the emulation operation.

20. The method of claim 18, further comprising:
receiving power status information from the core power control module, the power status information including information regarding the power status of the core module; and
determining the value of the one or more power status bits based on the received power status information.

21. The method of claim 17, further comprising:
injecting one or more first power status bits into the test data shift path from one or more first power status registers positioned upstream from the data registers and the alternative registers; and
injecting one or more second power status bits into the test data shift path from one or more second power status registers positioned upstream from the data registers and the alternative registers, the one or more second power status bits overwriting the first power status bits and comprising information regarding the power status of the core module.

22. The method of claim 21, wherein the one or more second power status bits indicate the power status of the core module at both the beginning and the end of an emulation operation.

23. The method of claim 17, further comprising: monitoring the state of a TAP controller associated with the core module using a shadow TAP; and
controlling the alternative registers using the shadow TAP in order to output the appropriate number of bits into the test data shift path after the core module is powered down.

24. The method of claim 17, further comprising:
receiving at a multiplexer data shifted out of one of the data registers;
receiving at the multiplexer data shifted out of the alternative registers;
receiving at the multiplexer power status change data from the core power control module, the power status change data indicating a change in the power status of the core module;
the multiplexer selecting either data received from the data register or data received from the alternative registers to communicate along the test data shift path, wherein the selection is based at least on the received power status change data.

25. The method of claim 17, further comprising preventing the core power control module from changing the power status of the core module during the emulation operation.

26. The method of claim 17, further comprising:
receiving one or more emulation input signals at an emulation control module, the input signals being communicated in parallel to the emulation control module and to the core module;
determining the status of the emulation operation based at least on the received emulation input signals;
receiving from the core power control module a request to change the power status of the core module;
determining whether to approve the request based at least on the status of the ongoing emulation operation; and
sending a response to the core power control module indicating whether the request was approved.

27. A method of maintaining emulation capability in a multi-core silicon-on-chip device, the method comprising:
preventing a core power control module associated with a core module from powering down the core module during an emulation operation involving the core module;
receiving one or more emulation input signals at an emulation control module associated with the core module, the input signals being communicated in parallel to the emulation control module and to the core module;
determining the status of the emulation operation based at least on the received emulation input signals;
receiving from the core power control module a request to change the power status of the core module;
determining whether to approve the request based at least on the status of the emulation operation; and
sending a response to the power control module indicating whether the request was approved.

* * * * *